(12) United States Patent
Martin et al.

(10) Patent No.: US 7,596,880 B2
(45) Date of Patent: Oct. 6, 2009

(54) SCANNING UNIT OF AN OPTICAL POSITION MEASURING DEVICE AND OPTICAL POSITION MEASURING DEVICE

(75) Inventors: Barbara Martin, Traunreut (DE); Oliver Schenk, Palling (DE); Robert Siegel, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 369 days.

(21) Appl. No.: 11/517,079

(22) Filed: Sep. 7, 2006

(65) Prior Publication Data
US 2007/0056181 A1 Mar. 15, 2007

(30) Foreign Application Priority Data
Sep. 13, 2005 (DE) .................. 10 2005 043 432
Sep. 13, 2005 (DE) .................. 10 2005 043 433

(51) Int. Cl.
*G01D 5/347* (2006.01)
(52) U.S. Cl. .................. 33/707; 33/706; 250/237 G
(58) Field of Classification Search ........... 33/706–708, 33/1 M; 250/237 G; 356/618
See application file for complete search history.

(56) References Cited
U.S. PATENT DOCUMENTS

| | | | |
|---|---|---|---|
| 4,500,097 A | 2/1985 | Sakamoto et al. | |
| 4,564,294 A * | 1/1986 | Ernst | 356/618 |
| 4,878,628 A | 11/1989 | Takeda et al. | |
| 4,906,838 A | 3/1990 | Sogabe et al. | |
| 5,283,434 A * | 2/1994 | Ishizuka et al. | 250/237 G |
| 5,433,911 A * | 7/1995 | Ozimek et al. | 264/261 |
| 5,528,934 A | 6/1996 | Nelson et al. | |
| 6,769,195 B2 * | 8/2004 | Huber et al. | 33/706 |
| 6,822,220 B2 * | 11/2004 | Lesniak | 250/231.13 |

FOREIGN PATENT DOCUMENTS

| | | |
|---|---|---|
| DE | 93 21 307 U1 | 2/1997 |
| EP | 0 120 205 B1 | 2/1988 |
| EP | 0 328 661 B1 | 1/1994 |
| GB | 2 167 863 A | 6/1986 |

* cited by examiner

*Primary Examiner*—G. Bradley Bennett
*Assistant Examiner*—Tania C Courson
(74) *Attorney, Agent, or Firm*—Brinks Hofer Gilson & Lione

(57) ABSTRACT

A scanning unit including a light source for illuminating a scale by a light beam and a detector for detecting the light beam which has been modulated by the scale as a function of a relative position between two objects. An inner chamber of the scanning unit in which the light beam extends is closed off in a dust-proof manner against an outer chamber, and the inner chamber is closed off by a transparent body, through which the light beam passes. The inner chamber is connected with the outer chamber via a filter which is dust-proof, but permeable to gas and vapor.

20 Claims, 6 Drawing Sheets

SCANNING UNIT OF AN OPTICAL POSITION MEASURING DEVICE AND OPTICAL POSITION MEASURING DEVICE

Applicants claim, under 35 U.S.C. § 119, the benefit of priority of the filing date of Sep. 13, 2005 of two German patent applications, copy attached, Serial Numbers 10 2005 043 432.0 and 10 2005 043 433.9, filed on the aforementioned date, the entire contents of each of which is incorporated herein by reference.

BACKGROUND OF THE INVENTION

1. Field of the Invention

The present invention relates to a scanning unit of an optical position measuring device, as well as to an optical position measuring device.

2. Discussion of Related Art

Optical position measuring devices are used for measuring lengths and angles. They are used in particular in connection with processing machines for measuring the relative movement of a tool in relation to a workpiece to be processed, with robotic devices, coordinate measuring machines, and increasingly in the semiconductor industry. In this connection they are often exposed to rough environmental conditions.

In order to prevent measuring errors, the light beam path of the optical scanning device should remain undisturbed by ambient media. To this end, the scale and the scanning unit of known position measuring devices are arranged in a housing. The housing has a slit, which is closed off by elastic sealing lips, through which a carrier for the scanning unit extends. Such a housing cannot completely prevent the penetration of ambient media. Moreover, the scanning unit is often conducted along the scale and/or along the housing via guide elements. The guide elements are rolling or sliding elements, which are supported on the scale and/or on the housing. In the course of this, dust can be created inside the housing by friction between the scale or housing and the guide elements, which disturbs the light beam path of the scanning device.

For eliminating these negative effects, the scanning unit in accordance with EP 0 120 205 B1 is hermetically sealed.

The disadvantage in connection with a hermetic seal lies in the possibility of the formation of liquids condensing on optical surfaces in the hermetically sealed inner chamber in case of temperature changes.

In many applications the position measuring device is furthermore subjected to electrical fields, in particular interfering electrical alternating fields, which act on electrically conducting elements of the scanning unit and cause electrical interference signals, and thus are the cause of erroneous position detection. Furthermore, electrical charges can build up on components because of the relative movement between the scanning unit and the scale, which in the end lead to electrical discharges between the scanning unit and the scale because of a potential differential being built up. These suddenly occurring discharges can also result in erroneous position detection.

It has also already been realized that the electrically conducting coating of the scanning plate represents a source of interference. It has therefore already been suggested to ground this coating, too.

An optical angle measuring device with a disk-shaped scale and a scanning unit which scans this scale is known from EP 0 328 661 B1. On its surface facing the scale, a scanning plate made of glass has a chromium layer, which constitutes a scanning pattern. This chromium layer is electrically connected to a reference potential, i.e. grounded. Grounding takes place by a contact element in the form of a soldered connection between the chromium layer and a shielding body.

Such a solution is only possible if a sufficient distance between the scanning plate and the scale is available.

In connection with particularly highly accurate position measuring devices the scanning distance is so short, that this contacting of the scanning pattern becomes problematical.

OBJECTS AND SUMMARY OF THE INVENTION

An object of the present invention is based on embodying a scanning unit of an optical position measuring device in such a way that it functions dependably and scanning remains undisturbed as much as possible.

This object is attained with a scanning unit of an optical position measuring device, having:

a light source for illuminating a scale by a light beam, and having a detector for detecting the light beam which has been modulated by the scale as a function of a relative position between two objects, wherein an inner chamber of the scanning unit in which the light beam extends is closed off in a dust-proof manner against an outer chamber, and the inner chamber is closed off by a transparent body, through which the light beam passes, wherein the inner chamber is connected with the outer chamber via a filter which is dust-proof, but permeable to gas and vapor.

This object is furthermore attained by a scanning unit in which a scale, which is movable relative to it in the measuring direction, can be optically scanned, having a scanning plate with a first surface facing the scale and a second surface facing away from the scale, wherein an electrically conductive opaque layer, which delimits a window, is applied to the first surface, which is connected by a contact element to an electrically conducting body having a reference potential, wherein the scanning plate has a surface area which is set back with respect to the first surface and has an electrically conducting coating and is in contact with the opaque layer, and that the contact element contacts this coating at the set back surface area.

It is furthermore intended to create an optical position measuring device which operates dependably.

This object is attained by a position measuring device for measuring the relative position of two objects, having a scale and a scanning unit which is movable in the measuring direction relative to the scale, with a light source for illuminating a scale by a light beam, and having a detector for detecting the light beam which has been modulated by the scale as a function of the relative position between the two objects, wherein an inner chamber of the scanning unit in which the light beam extends is closed off in a dust-proof manner against an outer chamber, and the inner chamber is closed off by a transparent body, through which the light beam passes, wherein the inner chamber is connected with the outer chamber via a filter which is dust-proof, but permeable to gas and vapor.

The advantages which can be attained by the present invention include that the position measuring device can be employed under adverse conditions without restrictions.

Further details and advantages of the present invention will be explained in the ensuing description of exemplary embodiments in conjunction with the drawings.

DETAILED DESCRIPTION OF THE PREFERRED EMBODIMENTS

Figure 1:
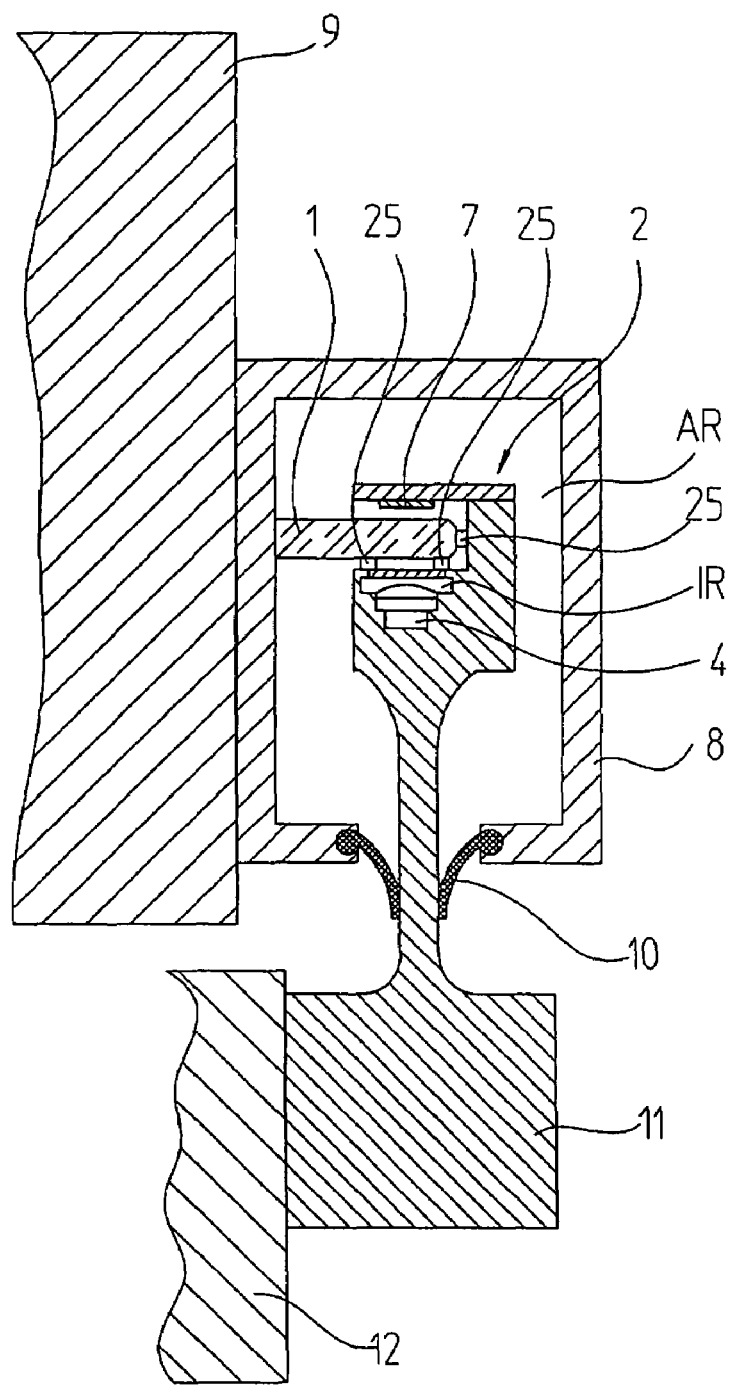
FIG. 1 is a cross section through an embodiment of an optical measuring device in accordance with the present invention.

The present invention is represented in FIGS. 1 to 5 by an example of a linear measuring device, in which a transparent scale 1 is scanned by a scanning unit 2, which can be moved relative to the scale 1 in the measuring direction X. The scale 1 has a measuring graduation 3, which is scanned by the scanning unit by transmitted light. For this purpose the scanning unit 2 has a light source 4, which emits a light beam L, which is collimated by a lens 5 and then impinges on the scale 1 through a transparent scanning plate 6. The light beam L is modulated as a function of the position by the measuring graduation 3 on the scale 1 and impinges on a detector 7.

The scale 1 is arranged inside a housing 8, which in turn is fastened on an object 9 to be measured, for example a machine bed of a machine tool. The housing 8 has a slit, which extends in its longitudinal direction in the measuring direction X and is closed by sealing lips 10, which are inclined in a roof shape, through which a carrier 11 extends with a sword-shaped center piece. The carrier 11 is fastened on a carriage 12 of the machine tool, which can be displaced relative to the machine bed.

To prevent interfering media—dust in particular—from interfering with the light beam L, an inner chamber IR of the scanning unit 2, through which the light beam L passes, is closed off against an outer chamber AR. Viewed in the direction of the light beam L, on one side this inner chamber IR is delimited by the lens 5, and further in the direction of the light beam L by the scanning plate 6. An optical surface 5.1 of the lens 5 and an optical surface 6.1 of the scanning plate 6 are located in the inner chamber IR, and an optical surface 6.2 is located outside. The optical surface 5.1 of the lens 5 and the optical surface 6.1 of the scanning plate, which are located in the inner chamber IR, are therefore protected against collecting dust.

For preventing the formation of condensate on these surface 5.1 and 6.1, the inner chamber is not hermetically sealed in a gas-tight manner against the outer chamber AR, but only dust-proof and permeable to gas and water vapor. To this end a filter 13, which is designed to be dust-proof, but gas- and vapor-permeable, is arranged as the connection between in the inner chamber IR and the outer chamber AR. The filter 13 is a porous filter with pores which do no let dust pass from the outer chamber AR into the inner chamber IR, but let as much moisture as possible through from the inner chamber IR to the outer chamber AR, and remove it.

The filter 13 includes, for example, of a sinter material, such as a ceramic, special steel or brass material of a pore size of a few µm, or of a glass fiber material, or textile fibers (GORETEX) of a pore size down to below 1 µm. Preferably the size and arrangement of the pores of the filter has been selected in such a way that they will let water vapor pass, but not water in liquid form, or dust.

When impinging on the scanning plate 6, the light beam emanating from the light source 4 is delimited by an opaque layer 20, which constitutes at least one window 70. This opaque layer 20 delimits the window and in this way forms a screen, in addition, the electrically conducting opaque layer 20 constitutes a scanning grid within the window, which in a known manner includes opaque areas of the layer 20 and transparent areas alternatingly arranged next to each other. The scanning grid is used for forming several partial light beams, which act in alternation with the measuring graduation 3 of the scale 1 and impinge on the detector 7 for the generation of position-dependent scanning signals, which are phase-shifted with respect to each other.

The scanning plate 6 has two surfaces 6.1 and 6.2, which extend in parallel and are located opposite each other. One of these surfaces, 6.2, is arranged opposite the scale 1 and faces it and extends parallel with respect to the surface of the scale 1 which is to be scanned and contains the measuring graduation 3. This surface 6.2 is located in the outer chamber AR and will be called the first surface 6.2 in what follows. The second surface 6.1 is located protected in the inner chamber IR and is arranged facing away from the scale 1.

The electrically conducting opaque layer 20 constituting the window has been applied to the first surface 6.2. In this case the scanning plate 6 is made of an electrically insulating transparent material, glass in particular, and the layer 20 is made of a metallic layer, in particular chromium.

The scanning plate 6 has a surface area 21 which is set back with respect to the first surface 6.2 and is also coated to be conductive. This electrically conductive coating 22 is preferably constituted as one piece with the opaque layer 20, but can also be a separate coating electrically connected with the layer 20 and extends at least partially parallel underneath or above the layer 20, which will be described in greater detail below by means of FIG. 10. The surface area 21 of the scanning plate 6 identified as set back is farther removed from the scale 1 than the surface 10 extending parallel with respect to the scale 1. The distance between the scale 1 and the first surface 6.2 of the scanning plate 6 is a few µm.

Figure 3:
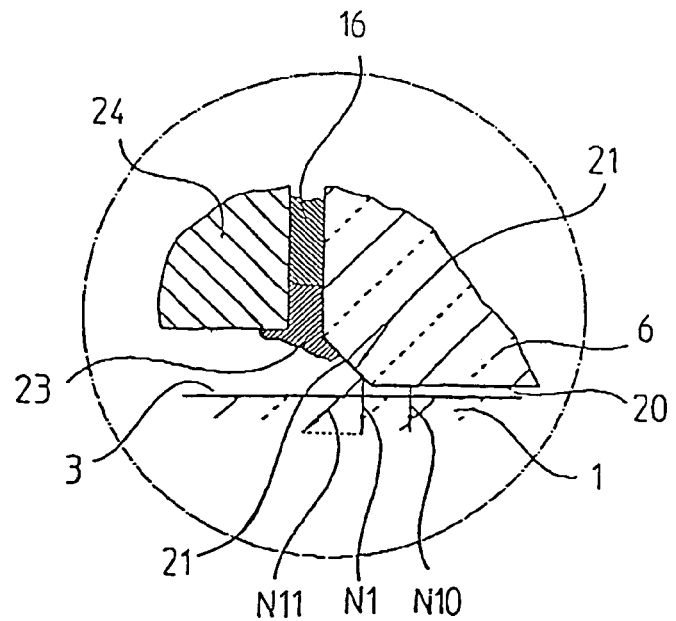
FIG. 3 is an enlarged view of a circular region of FIG. 2.
Figure 4:
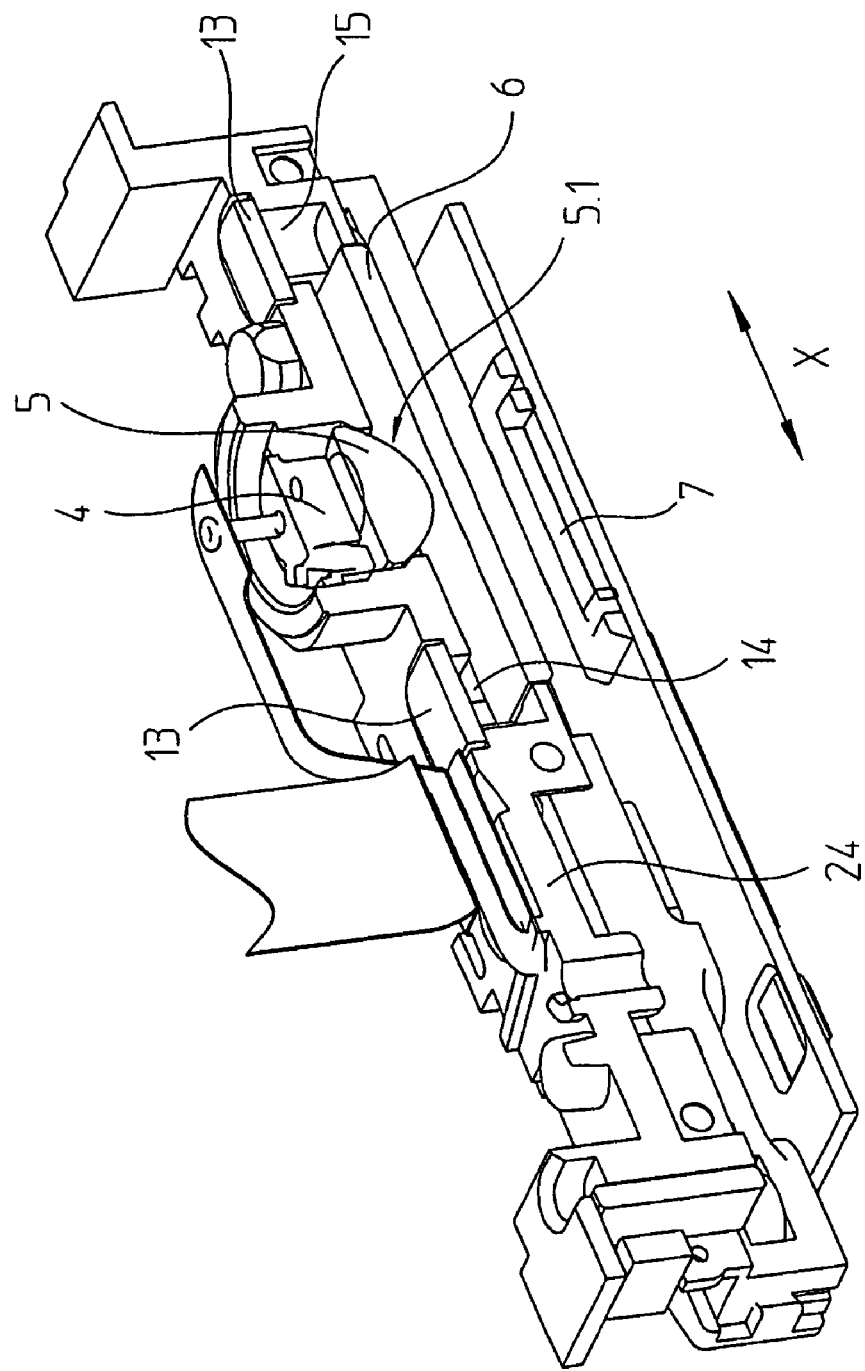
FIG. 4 is a perspective sectional representation of an embodiment of a scanning unit of the optical position measuring device of FIG. 1.
Figure 5:
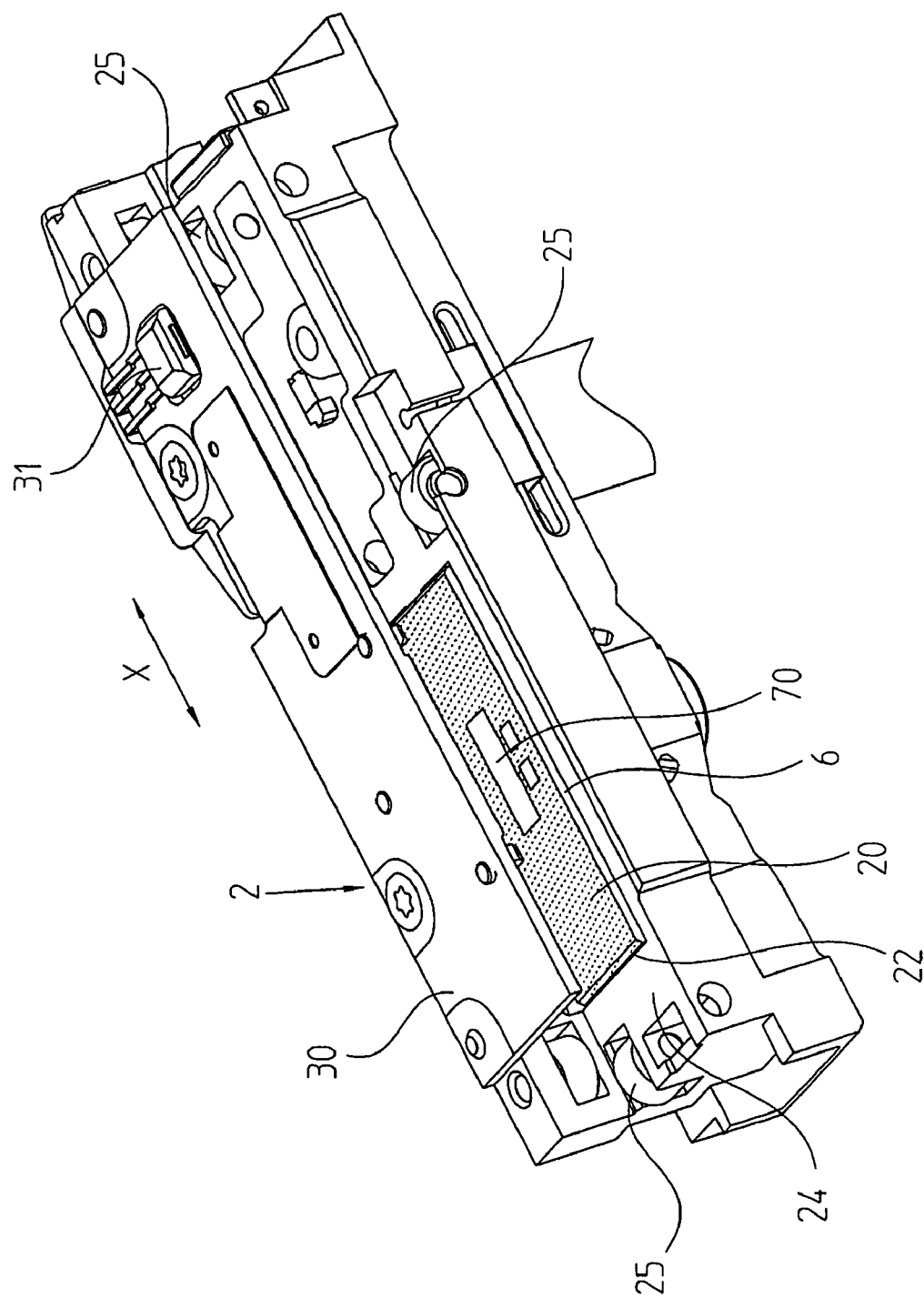
FIG. 5 is a further perspective sectional representation of the scanning unit of FIG. 4.

The coating 22 is contacted at the set-back surface area 21 via a contact element 23 by an electrically conductive body 24, which has a reference potential OV. An example of this contacting is represented in FIG. 3 in detail. The coating 22 at the set-back surface area 21, i.e. at the bevel, is a continuation of the layer 20. The contact element is an electrically conductive adhesive 23, in particular a conductive silver adhesive, which has been applied in such a way that it does not extend, viewed in the direction toward the scale 1, beyond the layer 20 on the first surface 6.2, and in an advantageous manner does not extend beyond the first surface 6.2.

The electrically conductive body is a scanning carriage 24, which is conducted via ball bearings 25 along the scale 1 in the measuring direction X. The scanning carriage 24 is made, for example, of a conductive plastic material, in particular polycarbonate with a carbon fiber reinforcement, and is connected by an electrical connection to the reference potential OV.

The set-back surface area 21 extends with respect to the first surface 6.2 in such a way that it has a normal vector N11 which has a directional component N1 corresponding to the normal vector N10 of the first surface 6.2 of the scanning plate 6. In this case the surface area 21 is inclined with respect to the first surface 6.2, it has an angle of inclination of 45°±20° in particular. This has the advantage that the surface area 21 can be produced by simple tools by cutting down the surface, and that the surface area 21 can be coated (vapor-coated, sputtered) from the same direction as the first surface 6.2.

For a fixation of the scanning plate 6 over a long period of time it is often necessary to take further steps in addition to the contact element 23. In the represented example, the scanning plate 6 is fixed in place in an opening of the scanning carriage 24 by means of an adhesive 16. This adhesive 16 is introduced from the direction of the interior chamber IR, i.e. from the direction of the surface 6.1 of the scanning plate 6. Installation openings 14, 15 are provided for this purpose in the scanning carriage 24, through which the adhesive 16 can be introduced from the outer chamber AR into the inner chamber IR of the scanning carriage 24. The inner chamber IR is a hollow space in the scanning carriage 24, and the filters 13 have been inserted, for example glued, into the installation openings 14 and 15.

In the described exemplary embodiment, wherein the light beam L passes through the scale 1, the detector 7 is located outside the closed-off inner chamber IR (hollow space) of the scanning unit 2. If the present invention is employed in connection with a position measuring device wherein the scale is designed to be reflecting, and the detector 7 is located on the same side as the light source 4, the lens 5 and the scanning plate 6, the detector 7 is in an advantageous manner also arranged in the closed inner chamber of the scanning unit 2.

Figure 6:
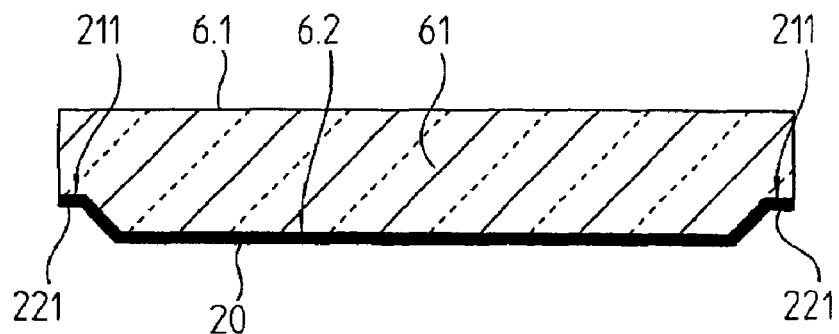
FIG. 6 shows an alternative embodiment of a scanning plate in accordance with the present invention.

It is alternatively or additionally possible to form a set-back surface area 211 on the scanning plate 61, which extends parallel with respect to the first surface 6.2, as represented in FIG. 6. A simple application of he coating 221 is possible here, too.

Figure 7:
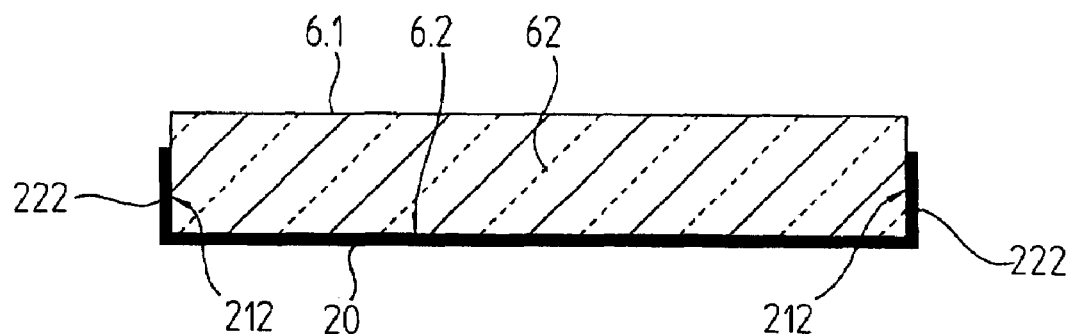
FIG. 7 is a further alternative embodiment of a scanning plate in accordance with the present invention.

An alternative embodiment of a scanning plate 62 is represented in FIG. 7. The set-back surface area 212 provided with the coating 222 here extends perpendicularly with respect to the first surface 6.2.

Figure 8:
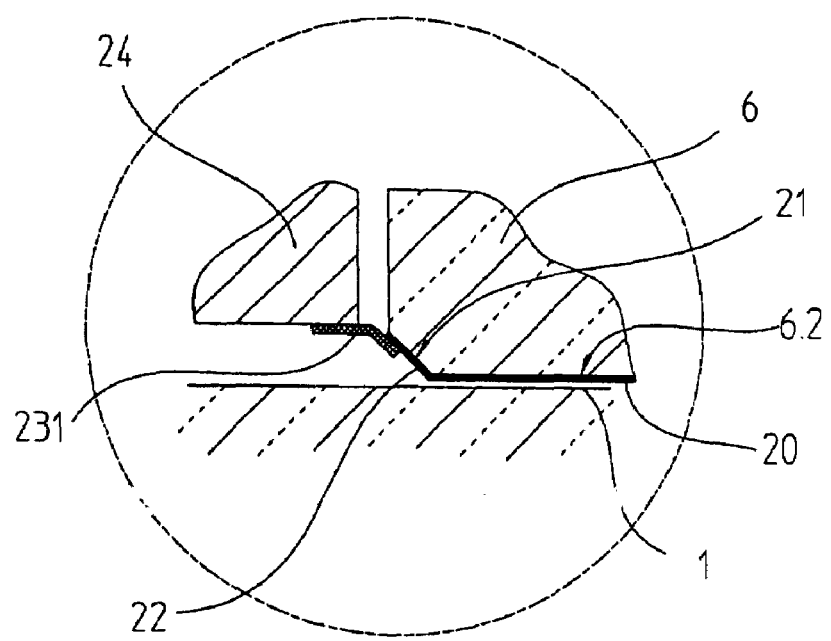
FIG. 8 shows an alternative embodiment of a contact element in accordance with the present invention.

An alternative contact element in the form of an electrically conductive contact spring 231 fastened on the body 24 is represented in FIG. 8, which is resiliently supported on the set-back inclined surface area 21 which is provided with the coating 22, and contacts the coating 22 in an electrically conductive manner.

Figure 9:
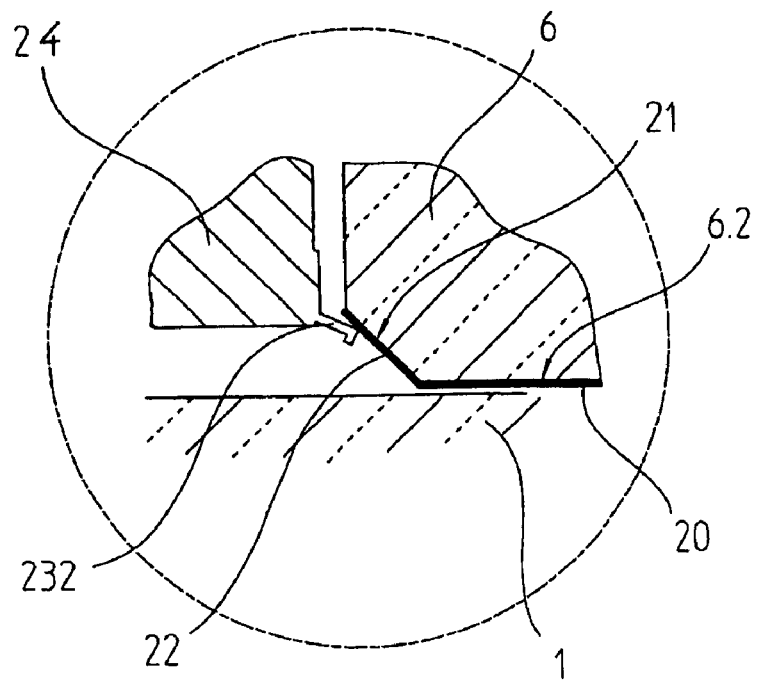
FIG. 9 is a further alternative embodiment of a contact element in accordance with the present invention.

A further embodiment of a contact element is represented in FIG. 9. Here, the contact element is a contact spring 232, formed in one piece on the body 24.

Figure 10:
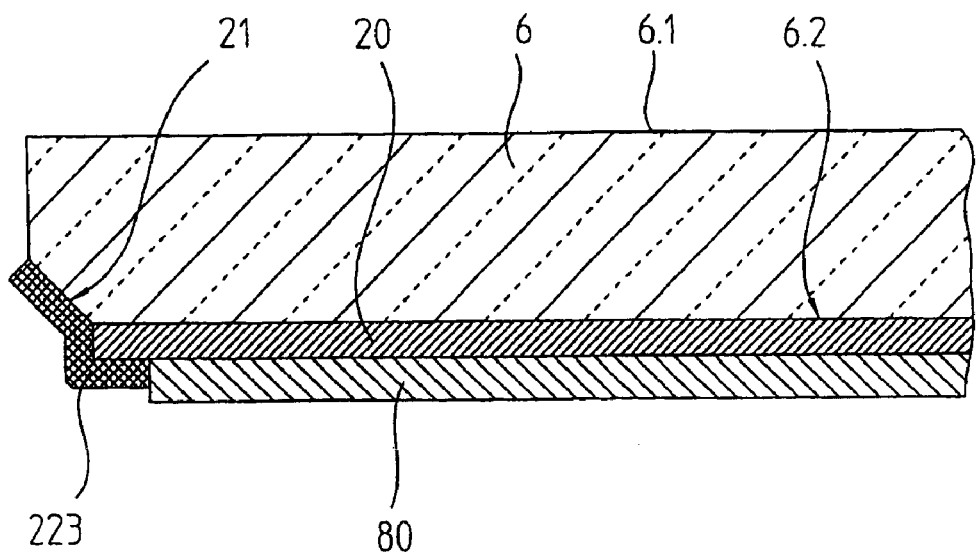
FIG. 10 shows a further embodiment of a contact plate in accordance with the present invention.

As already stated, the coating 22, 221, 222 can be embodied by continuing the layer 20 over the set-back surface area 21, 211, 212. An alternative to this is represented in FIG. 10. In this case the coating 223 of the set-back surface area 21 is embodied as a separate coating 223, which overlaps the layer 20. The coating 223 and the layer 20 are made of chromium, for example. For reducing reflection, a reflection-reducing and electrically non-conductive layer 80, for example made of chromium oxide or chromium dioxide, is assigned to the layer 20 and covers it.

In a manner not represented, the contact element can also be an electrically conductive lacquer. If the stability of the electrically conductive adhesive 23, or lacquer, is not sufficient for the dependable fixation in place of the scanning plate 6 on the body 24, it is possible to employ an additional, more stable adhesive 16, which is electrically non-conductive, if desired, as represented in FIG. 3.

As can be seen from the represented examples, a particularly space-saving construction is possible if the set-back surface area 21, 221, 222 is respectively located between the thickness of the scanning plate 6, i.e. between the two first surfaces 6.1 and second surfaces 6.2 facing each other.

Figure 2:
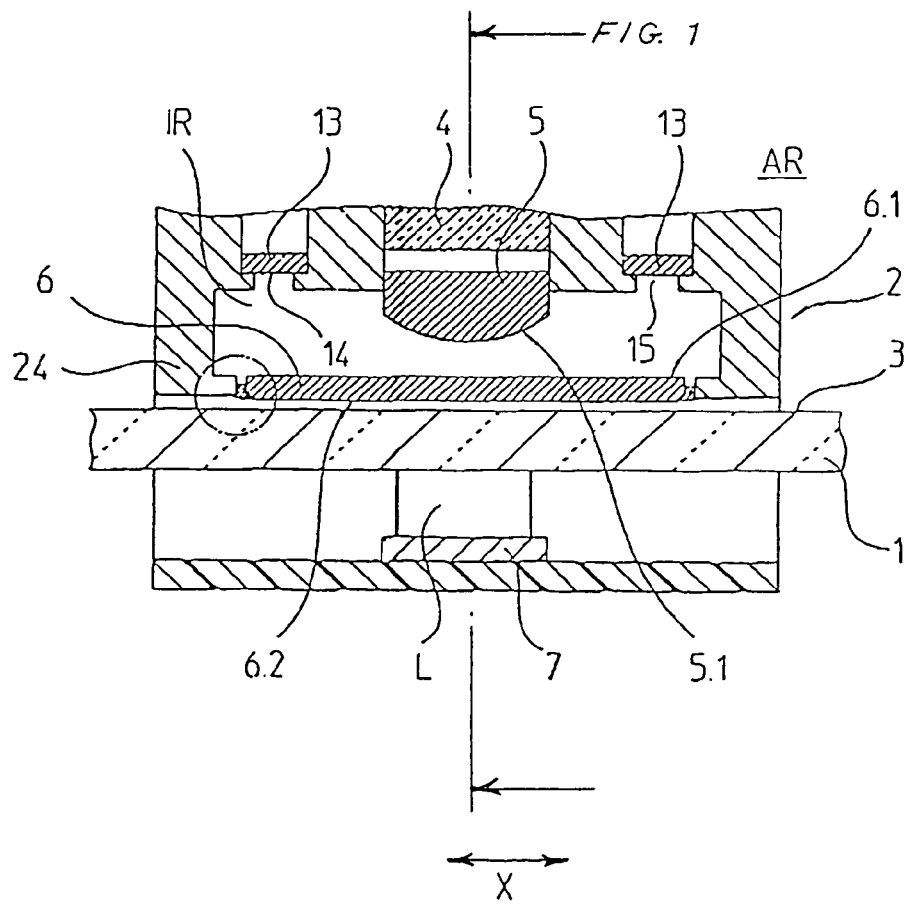
FIG. 2 represents a longitudinal section through the optical position measuring device.

As schematically represented in FIG. 2, the detector 7 is located on the surface facing the scale 1 of a printed circuit board 30 fastened on the scanning carriage 24. For further increasing the security from interference of the position measuring device, this printed circuit board 30 is a multi-layer board with two exterior grounding layers and a signal conducting layer between them. The electrical components 31 (FIG. 5) for signal processing are located on the surface of the printed circuit board 30 facing away from the scale 1.

The foregoing description is provided to illustrate the present invention, and is not to be construed as a limitation. Numerous additions, substitutions and other changes can be made to the present invention without departing from its scope as set forth in the appended claims.

We claim:

1. A scanning unit, comprising:
a light source for illuminating a scale by a light beam;
a detector for detecting said light beam which has been modulated by said scale as a function of a relative position between two objects,
an inner chamber in which said light beam extends is closed off in a dust-proof manner against an outer chamber of said scanning unit, and said inner chamber is closed off by a transparent body, through which said light beam passes,
wherein said inner chamber is connected with said outer chamber via a filter which is dust-proof, but permeable to gas and vapor.

2. The scanning unit in accordance with claim 1, wherein said filter is impermeable to water in liquid form.

3. The scanning unit in accordance with claim 1, wherein said filter is made of a porous material.

4. The scanning unit in accordance with claim 3, wherein said filter is made of a sinter material.

5. The scanning unit in accordance with claim 1, wherein said light beam radiates through said inner chamber, and said inner chamber is bordered on one side by a lens and on a second side by said transparent body, which is designed as a scanning plate.

6. A scanning unit, by which a scale, which can be moved relative to the scanning unit in a measuring direction, can be optically scanned, the scanning unit comprising:
a scanning plate with a first surface facing said scale and a second surface facing away from said scale;
an electrically conductive opaque layer, which delimits a window, is applied to said first surface, which is electrically connected by a contact element to an electrically conducting body having a reference potential,
wherein said scanning plate comprises a surface area, which is set back with respect to said first surface and comprises an electrically conducting coating and is in contact with said opaque layer, and said contact element contacts said electrically conducting coating at said set-back surface area.

7. The scanning unit in accordance with claim 6, wherein said contact element does not project past said opaque layer on said first surface.

8. The scanning unit in accordance with claim 6, wherein a normal vector of a set-back surface area of said scanning unit has a directional component which corresponds to a normal vector of said first surface of said scanning plate.

9. The scanning unit in accordance with claim 8, wherein said set-back surface area is inclined with respect to said first surface.

10. The scanning unit in accordance with claim 8, wherein said set-back surface area extends parallel with said first surface.

11. The scanning unit in accordance with claim 6, wherein said electrically conducting coating is a continuation of said opaque layer.

12. The scanning unit in accordance with claim 6, wherein said electrically conducting coating and said opaque layer overlap.

13. The scanning unit in accordance with claim 6, wherein said contact element is an electrically conductive adhesive or lacquer.

14. The scanning unit in accordance with claim 6, wherein said contact element comprises a contact spring.

15. The scanning unit in accordance with claim 6, wherein said first surface and said second surface extend parallel with each other.

16. A position measuring device for measuring a relative position of two objects, the position measuring device comprising:
 a scale;
 a scanning unit which is movable in a measuring direction relative to said scale, said scanning unit comprising:
  a light source for illuminating said scale by a light beam; and
  a detector for detecting said light beam which has been modulated by said scale as a function of said relative position between said two objects;
  an inner chamber in which said light beam extends is closed off in a dust-proof manner against an outer chamber;
  an outer chamber that closes off said inner chamber via a transparent body, through which said light beam passes, wherein said inner chamber is connected with said outer chamber via a filter which is dust-proof, but permeable to gas and vapor.

17. The position measuring device in accordance with claim 16, wherein said light beam passes through said inner chamber, and said inner chamber is delimited by said transparent body, which is arranged opposite of and spaced apart from said scale, and through which said light beam impinges on said scale, wherein said transparent body is designed as a scanning plate.

18. The position measuring device in accordance with claim 16, wherein said scanning unit is supported on said scale by a guide element.

19. The position measuring device in accordance with claim 18, wherein said scale and said scanning unit are arranged inside a housing, wherein a hollow space of said housing is said outer chamber of said scanning unit.

20. The position measuring device in accordance with claim 19, wherein said housing is attached to one of said two objects to be measured and has an opening, which is closed off by elastic sealing elements, through which a carrier for said scanning unit extends, wherein said carrier is connected with the other one of said two objects to be measured.

\* \* \* \* \*